United States Patent

Patterson et al.

[15] 3,700,042
[45] Oct. 24, 1972

[54] REAR FURROW WHEEL CONTROL STRUCTURE FOR DISC TILLERS AND THE LIKE

[72] Inventors: Roger Lee Patterson, Fonthill; Mario Ventresca, Welland, Ontario, both of Canada

[73] Assignee: Deere & Company, Moline, Ill.

[22] Filed: Nov. 5, 1970

[21] Appl. No.: 87,186

[52] U.S. Cl. ................................. 172/385, 172/386
[51] Int. Cl. ...................... A01b 23/04, A01b 15/14
[58] Field of Search......172/240, 278, 282, 284, 291, 172/383–386; 56/322, 377; 16/35; 280/411 C, 412, 442

[56] References Cited

UNITED STATES PATENTS

| | | | |
|---|---|---|---|
| 640,411 | 1/1900 | Parlin et al. | 172/385 |
| 1,200,106 | 10/1916 | Heylman | 172/386 |
| 2,560,726 | 7/1951 | Jones et al. | 172/383 |
| 2,697,394 | 12/1954 | Fyke | 172/386 |
| 2,960,170 | 11/1960 | Cantral | 172/282 |
| 2,648,270 | 8/1953 | Silver | 172/386 |
| 2,950,927 | 8/1960 | Hendrickson | 172/284 |

FOREIGN PATENTS OR APPLICATIONS

| | | | |
|---|---|---|---|
| 699,780 | 11/1953 | Great Britain | 172/383 |

*Primary Examiner*—Robert E. Pulfrey
*Assistant Examiner*—C. W. Hanor
*Attorney*—H. Vincent Harsha, Harold M. Knoth, William A. Murray, Raymond L. Hollister and John M. Nolan

[57] ABSTRACT

Control structure for the rear furrow wheel of a disc tiller or the like including a first arm pivotally mounted on the rear portion of the frame and a second arm pivotally mounted medially on the rearward end of the first arm and rotatably supporting the furrow wheel on one of its ends. A pair of concentric link members are connected to the arms and are slidable through a trunnion structure on the frame as the furrow wheel moves from its operating to its turning and transport positions. Adjustable stops on each of the members are biased against the forward end of the trunnion by a spring and cable mechanism to normally maintain the furrow wheel in its operating position, the mechanism being yieldable to permit the wheel to swing to its turning and transport positions in response to an abnormal side load on the wheel. A latch mechanism is provided to selectively lock the wheel in the latter position.

16 Claims, 8 Drawing Figures

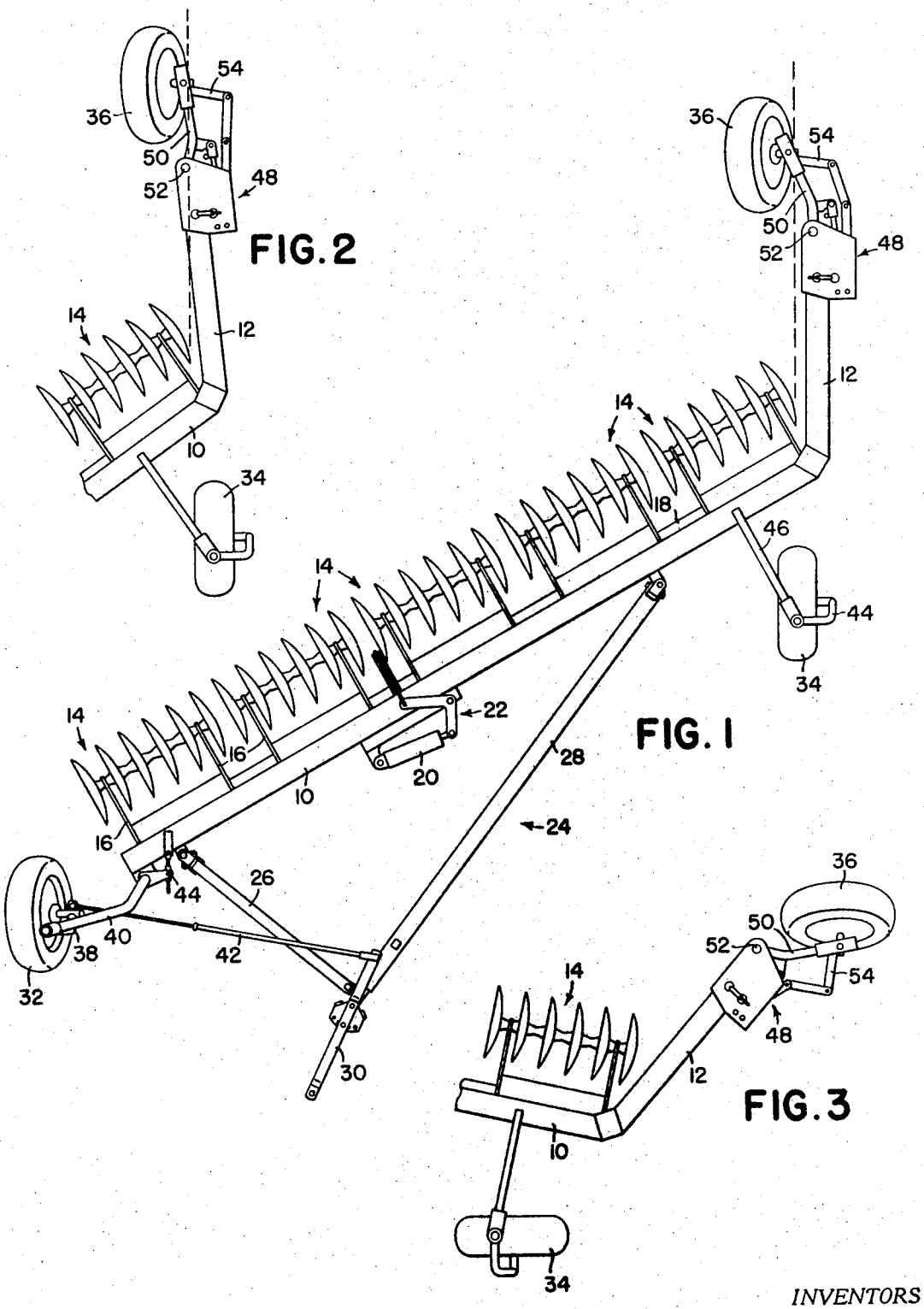

INVENTORS
ROGER L. PATTERSON
MARIO VENTRESCA

*INVENTORS*
ROGER L. PATTERSON
MARIO VENTRESCA

REAR FURROW WHEEL CONTROL STRUCTURE FOR DISC TILLERS AND THE LIKE

BACKGROUND OF THE INVENTION

The present invention relates generally to disc tillers and more particularly to a rear furrow wheel control structure therefor.

A disc tiller conventionally comprises an elongated frame adapted to be pulled at an angle to the direction of travel, a plurality of aligned discs mounted along the rear of the frame and adapted to be raised and lowered relative to the ground, and ground-engaging wheel means for supporting the frame relative to the ground, the latter means including a front furrow wheel adapted to ride in the furrow formed by the trailing disc on the preceding pass, a land wheel carried near the rear of the machine and forwardly of the frame, and a rear furrow wheel mounted on the trailing end of the frame and adapted to ride in the furrow formed by the end disc. Provision for adjusting both the lateral position and lead angle of the rear furrow wheel, according to the width of cut desired and the prevailing soil conditions in the field being worked, must be included in the structure supporting the wheel. In addition, since the tiller pivots about a point located forwardly of the rear furrow wheel when a left turn is negotiated, the mounting structure must permit the wheel to swing in a clockwise direction to follow around the turn, yet during normal operation the structure must hold the wheel in the furrow to prevent the machine from falling back when working on hillsides or in loose soil conditions. Finally, if, as is conventional procedure, the tiller is to be transported in an endwise manner, provision must be included in the support structure to permit the rear furrow wheel to pivot clockwise to a transport position and to rigidly lock the wheel in such position. Although various mounting structures have heretofore been devised which perform most or all of these functions, they are in general characterized by their complexity of construction and difficulty of operation.

SUMMARY OF THE INVENTION

It is, accordingly, the primary object of the present invention to provide a rear furrow wheel control structure for a disc tiller including means for performing each of the above specified functions, yet a structure characterized by its simplicity of construction and operation. To this end, the control structure of the invention comprises a first, rearwardly extending arm pivotally mounted on the frame, and a second arm pivotally mounted medially on the rearward end of the first arm and mounting the rear furrow wheel on one of its ends. A pair of link members are pivotally connected to the arms and extend forwardly to and are slidably received in a common pivot structure mounted on the frame. Adjustable stops on each of the link members are biased against the pivot structure by a cable and spring mechanism, the spring being extensible to permit the arms to swing clockwise about their respective pivotal mountings and thereby permit the wheel to assume its turning and transport positions. The stops on the two link members are quickly and easily adjustable to change the lateral position and lead angle of the wheel. During normal operation, the biasing force of the spring acts to hold the stop on one of the link members against the stop on the other link member, and, in turn, to hold the latter stop against the pivot structure, thereby maintaining the wheel in its normal position. As the tiller initiates a left-hand turn, the side load exerted on the wheel and transmitted to the link members forces the stops thereon away from the pivot structure against the urging of the spring mechanism. As the outer stop moves away from the pivot, the stop between the pivot and the outer stop, together with its associated link member, is free to move between the increasing limits defined by the pivot and outer stop. A latch mechanism is provided for selectively locking the wheel in its transport position.

BRIEF DESCRIPTION OF THE DRAWINGS

FIG. 1 is a plan view of the disc tiller incorporating the control structure of the present invention, with the rear furrow wheel adjusted for operation in soft ground conditions;

FIG. 2 is a fragmentary plan view of the rear portion of the tiller with the rear furrow wheel adjusted for hard soil conditions;

FIG. 3 is a view similar to FIG. 2 with the rear furrow wheel shown in its transport position;

DESCRIPTION OF THE PREFERRED EMBODIMENT

Figure 4:
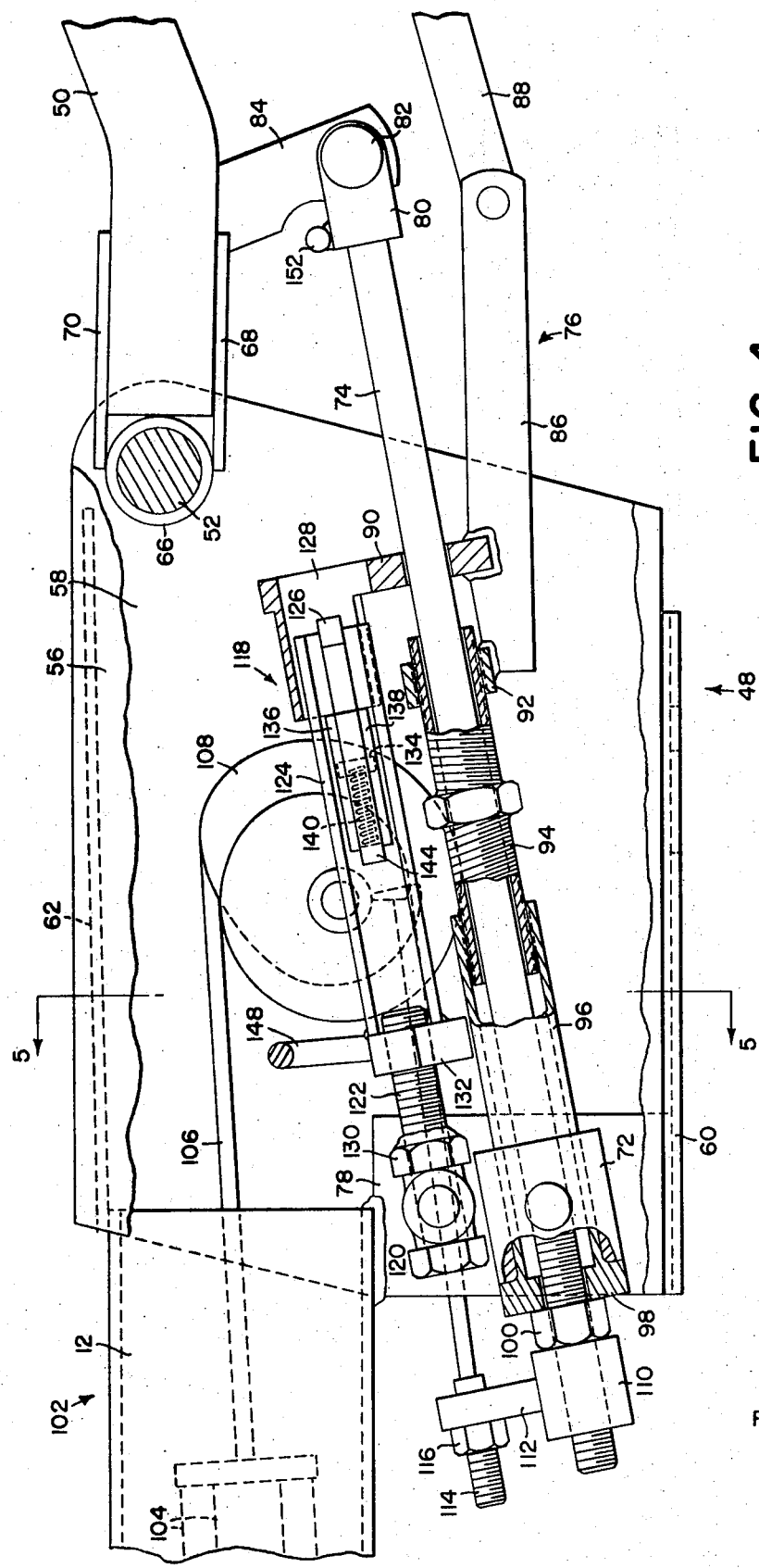
FIG. 4 is an enlarged plan view of the control structure, with portions removed and broken away for the sake of clarity.

In the ensuing description, right- and left-hand reference is determined by facing the direction of travel of the implement.

The disc tiller includes a generally L-shaped frame structure composed of an elongated, diagonal main beam 10 and a tail beam 12. A plurality of disc gangs 14 are mounted along the rear of the beam 10 for movement into and out of engagement with the ground, each gang 14 being independently resiliently mounted to enable the tiller to maintain a uniform discing depth despite lateral variations in the ground level. Each gang is carried by a pair of spaced arms 16 which are resiliently coupled at their forward ends to an elongated shaft 18 extending along the rear of the beam 10 and parallel therewith. A hydraulic cylinder 20 acts through a linkage 22 to rotate the shaft 18 and thereby to raise and lower the discs. A forwardly converging V-shaped hitch 24 is provided for attaching the tiller to an agricultural tractor, the structure comprising a pair of elongated members 26 and 28 connected at their rearward ends to spaced points on the beam 10 and interconnected at their forward ends. Pivotally mounted forwardly on the hitch 24 is a steering arm 30 adapted at its forward end for connection to the drawbar of the tractor.

The tiller frame is carried by a front furrow wheel 32, a land wheel 34, and a rear furrow wheel 36. The front furrow wheel 32, adapted to ride in the furrow left by the implement on its previous pass over the field, is carried by a generally vertical arm 38 which is pivotally mounted on the outer end of a second, laterally extending arm 40. A steering link 42 connects the arm 38 with the rearward end of the steering arm 30 and serves to steer the wheel 32 in response to lateral movement of the tractor drawbar. Adjustment of the lateral position of the wheel 32, to accommodate various soil conditions, is accomplished by means of a screw-adjusting mechanism 44 interconnecting the arm 40 with the beam 10. The land wheel 34 is carried by a generally vertical arm 44 pivotally mounted at the forward end of a second arm 46 extending forwardly from the left end of the beam 10, the pivotal mounting permitting the wheel 34 to caster freely during operation of the implement.

The structure supporting the rear furrow wheel 36, which constitutes the subject of the present invention, is shown generally in FIGS. 1–3 and includes a box-like structure 48 formed on the rearward end of the tail beam 12, a first, rearwardly extending arm 50 pivoted at its forward end on a pin 52 extending through the right rear corner of the box-like structure 48, and a second, transversely disposed arm 54 pivoted medially on the rearward end of the arm 50 and rotatably mounting the rear furrow wheel 36 on its right end. During normal operation of the tiller, the rear furrow wheel 56 rides in the furrow formed by the end disc (indicated by a dashed line in FIGS. 1 and 2) and acts to resist the tilling forces tending to shift the implement to the left. To accommodate various soil conditions, the angle of the tiller relative to a line transverse to the direction of travel, and thus the width of the strip tilled, is adjustable, the angle being relatively smaller for soft soil conditions (FIG. 1) and relatively larger for hard soil conditions (FIG. 2). This angle or width adjustment is accomplished, in part, by adjusting the lateral position of the rear furrow wheel 36 relative to the frame. As is apparent from a comparison of FIGS. 1 and 3, the wheel is disposed farther to the right in the soft ground setting than in the hard ground setting, such that the wheel 36, in both settings, rides in the furrow left by the end disc. An additional adjustment necessitated by varying soil conditions is that of the lead angle of the wheel 36, this angle being controlled by the position of the arm 54 relative to the frame.

When the implement is transported in an endwise manner, the arm 50 and wheel 36 are swung clockwise about the pin 52 to the transport position shown in FIG. 3, the wheel in this position being aligned with the direction of travel of the implement. The wheel and arm are also permitted to swing in a clockwise direction when the tiller is turned to the left, since the pivot point of the machine when negotiating such a turn is in the general area of the left end disc. While permitting the wheel to assume its transport and turning positions in response to an abnormal side load imposed thereon, the control structure must, at the same time, normally maintain the wheel 36 in its working position in the furrow, as illustrated in FIGS. 1 and 2.

Figure 5:
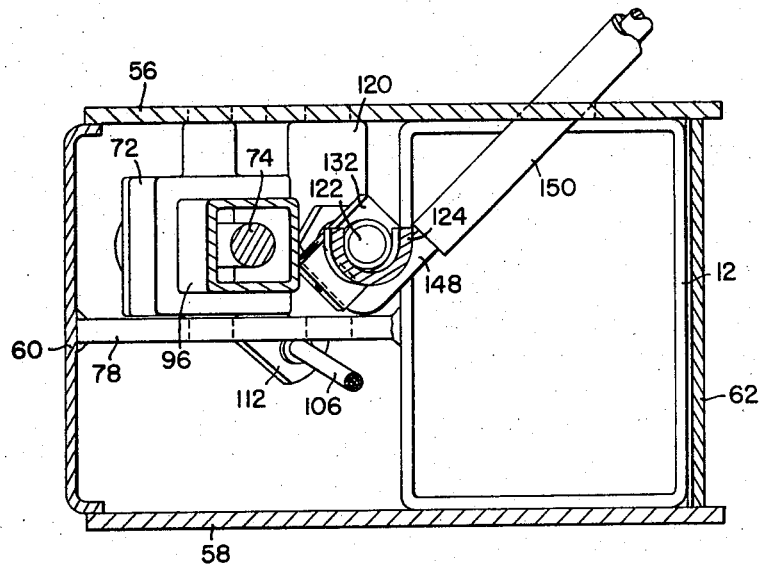
FIG. 5 is a sectional view taken generally along the line 5—5 of FIG. 4.
Figure 6:
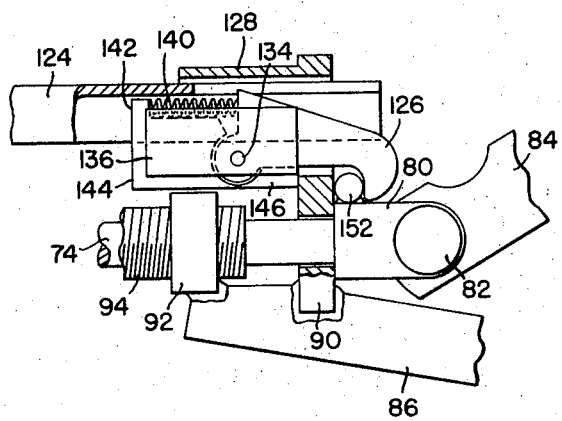
FIG. 6 is a fragmentary plan view of the transport lock mechanism of the invention, showing the mechanism in its locked in transport position.
Figure 7:
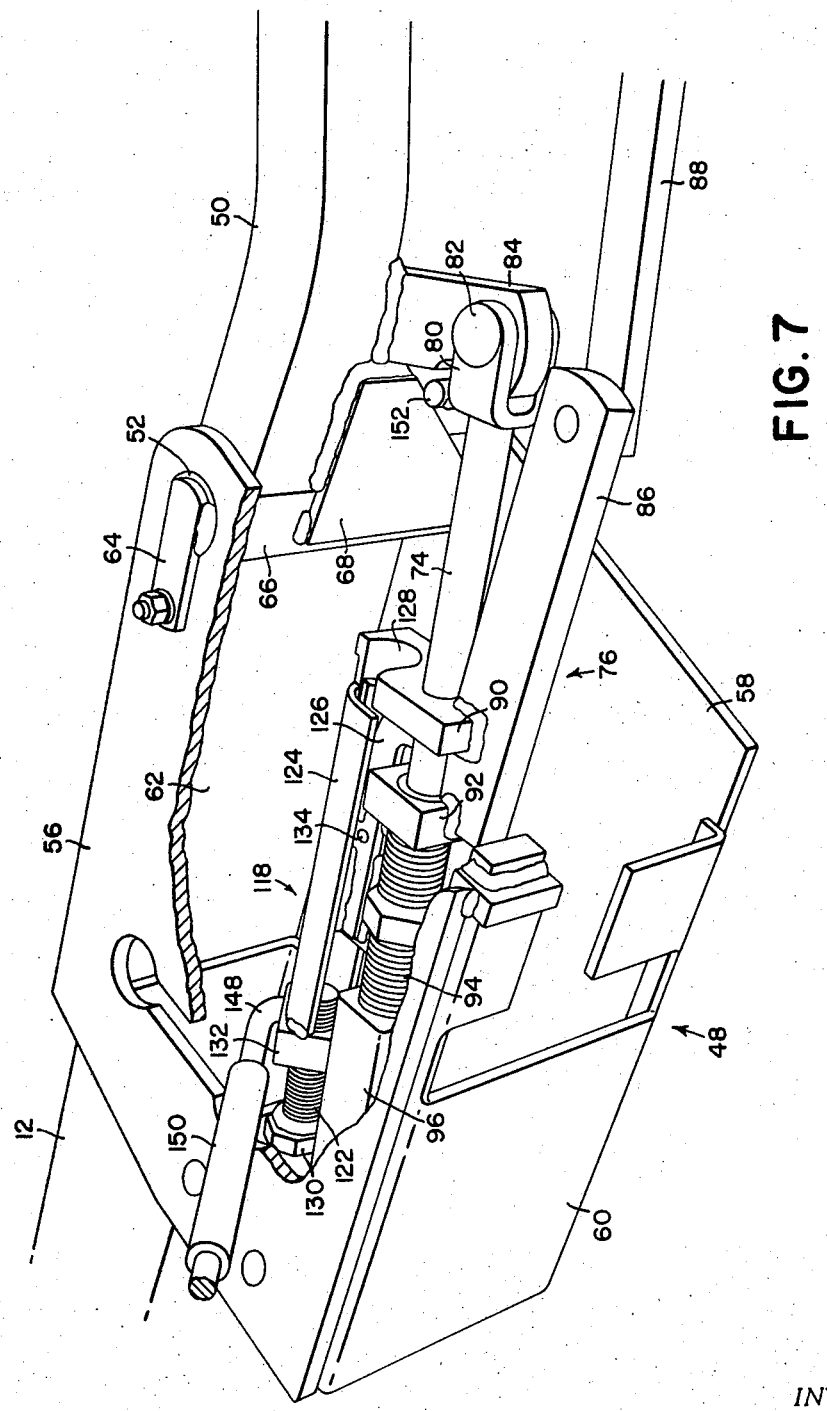
FIG. 7 is a left rear perspective view of the control structure with a portion of the top cover plate broken away for the sake of clarity and showing the mechanism in its normal operating position; and, FIG. 8 is a perspective view of the structure showing the mechanism locked in its transport position.
Figure 8:
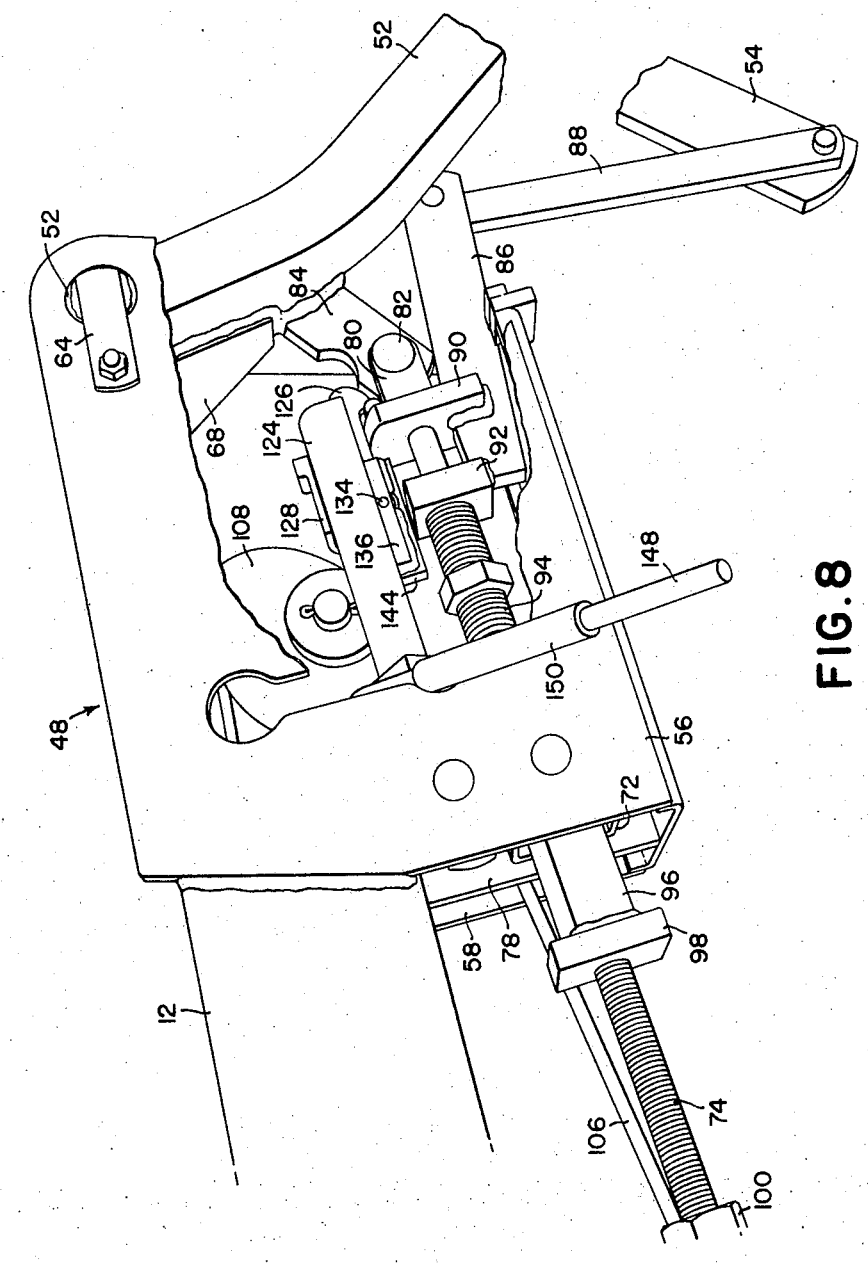

Reference is now made to FIGS. 4–8. As shown therein, the box-like structure 48 is composed of upper and lower plates 56 and 58, respectively, welded to the upper and lower surfaces of the tail beam 12 and interconnected with left and right side walls 60 and 62, respectively. In FIGS. 4, 7 and 8, the upper plate 56 has been broken away for the sake of clarity. The arm 50 extends between the plates 56 and 58 and is pivotally mounted therein on the vertical pin 52, which extends through aligned apertures in the plates and includes a member 64 welded to its upper end and bolted to the upper plate 56. A vertical tubular member 66, braced to the end of the arm 50 with triangular gussets 68 and 70, receives the pin 52.

The basic elements of the control structure comprise a pivot structure or trunnion 72 mounted forwardly in the box structure 48, a first link member 74 pivotally connected to the arm 50 and extending forwardly through and slidably received in the trunnion 72, and a second link member 76 connected to the left end of the arm 54 and also slidably received in the trunnion 72. As shown best in FIG. 5, the trunnion is mounted between the upper plate 56 and a rectangular plate 78 between the plates 56 and 58 and extending from the beam 12 to the left side walls 60. The first link member 74 comprises a circular cross-sectioned straight rod threaded at its forward end and provided with a clevis 80 on its rearward end, the latter being pivotally connected at 82 to a bracket 84 fixed to the left side of the arm 50. The second link member 76 is an assembly comprising, from rear to front, a fore-and-aft extending arm 86, the rearward end of which is linked by a member 88 to the left end of the arm 54, a support member 90 fixed to the forward portion of the arm 86 and slidably receiving the link 74, a block 92 fixed to the extreme forward end of the arm 86 and having a threaded aperture therein, a pipe section 94 having oppositely threaded end portions and an enlarged hexagonal center section, the rearward end of the pipe 94 being threadably received in the block 92, a square tube section 96 having an internally threaded rearward end portion receiving the threaded forward portion of the pipe section 94, the tubular section extending through the trunnion 72, and a stop block or flange 98 fixed to the end of the tube section 96 on the forward side of the trunnion 72. As is apparent particularly from FIG. 4, the first and second link members 74 and 76 are concentric, the first link 74 extending axially through the various members comprising the second link assembly 76.

In the normal operating position of the mechanism shown in FIG. 4, the stop block 98 on the link member 76 abuts the forward end of the trunnion 72, and a nut 100, threadably received on the forward end of the link 74 and acting as a stop member therefor, abuts the forward end of the stop block 98.

The stop block 98 and nut 100 are normally maintained against the trunnion 72, and the wheel 36 is thereby maintained in its normal operating position, by means of a spring and cable mechanism 102. The latter mechanism comprises a battery of coil springs 104 contained within the tail beam 12 and anchored at their forward ends to the beam (not shown), a cable 106 connected to and extending rearwardly from the spring battery, the cable passing around a variable radius sheave 108 rotatably supported on the bottom plate 58 of the structure 48, thence forwardly again to the vicinity of the forward end of the link 74. A bushing 110 received loosely by the forward end of the link 74 and abutting the nut 100 has a bracket 112 fixed to its side which is apertured to receive a threaded rod 114 connected to the forward end of the cable 106. A nut 116 on the rod 114 maintains the latter in the bracket 112 against the urging of the springs 104. The forward force exerted by the springs 104 is transformed by the cable and sheave to a rearward force urging the links 74 and 76 against the forward end of the trunnion 72. This force, absent an abnormal side load on the wheel 36, is sufficient to maintain the wheel in its normal working position, thus counteracting the tendency of the tiller to fall back when operating on hillsides or in loose soil conditions. The stops 98 and 100 on the link members 74 and 76, respectively, are adjustable to vary the normal operating position of the wheel, as required by prevailing soil conditions. Rotation of the nut 100 on the forward end of the link 74 is effective to pivot the first arm 50 about the pin 52 and thereby change the lateral position of the wheel 36, while rotation of the pipe section 94 of the second link assembly 76 is effective to change the position of the second arm 54 relative to the frame and thereby adjust the lead angle of the wheel. The lead angle adjustment is essentially a fine adjustment, since the geometry of the control linkage is such that as the lateral position of the wheel is changed, the approximately correct lead angle is automatically maintained.

The spring and cable mechanism 102 operates normally to maintain the wheel 36 in its operating position, but is yieldable to permit the wheel to pivot clockwise about the pin 52 in response to an abnormal load acting on the right side of the wheel. When the tiller is negotiating a left-hand turn, for example, such an abnormal side load is imposed on the wheel, since, as previously explained, the pivot point of the machine for such a turn is located at approximately the left-hand disc. During the turn, the force acting on the wheel pivots the arm 50 clockwise about the pin 52, which in turn pushes the link 74 forwardly through the trunnion 72, against the urging of the springs 104. As the stop or nut 100 on the link 74 is moved away from the end of the trunnion, the stop block 98 is no longer restrained by the nut and is free to move between the increasing limits defined by the nut and trunnion. Although the length of the springs 104 and thus the force exerted thereby increases as the wheel pivots to its left turn position, the variable radius sheave 108 acts to maintain the force acting against the arm 50 at a relatively constant level. It will be apparent from the view of the sheave in FIG. 4 that, as the sheave rotates in a clockwise direction to permit the wheel to assume its left turn position, the lever arm acted on by that end portion of the cable extending forwardly to the springs 104 decreases, while the lever arm acted on by the opposite end portion of the cable simultaneously increases.

The furrow wheel 36 is locked in its transport position against the urging of the spring and cable mechanism 102 by means of a latch mechanism comprising, generally, a trunnion support 120 mounted between the plates 56 and 78 and adjacent to the trunnion 72, a bolt 122 extending rearwardly through the trunnion 120, an elongated U-shaped latch support member 124 in threaded engagement with the bolt 122, and a spring-loaded latch 126 carried in the rearward end of the support member 124. The rear portion of the support member 124 is slidably received in a trough 128 formed in the member 90 of the link assembly 76, the member 90 thus maintaining the latch mechanism 118 in parallel relation with the links 74 and 76 as the latter pivot about the trunnion 72. A nut 130 is welded to the bolt 122 to retain the latter in the trunnion support 120, but sufficient clearance is provided to permit the bolt to be turned freely within the trunnion. The rearward end of the bolt is threaded into a block 132 fixed to the forward end of the U-shaped support member 124 for adjusting the fore-and-aft position of the support 124, and thus the latch 126, relative to the trunnion 120. As shown best in FIGS. 4 and 6, and latch 126 is pivotally mounted on the center portion of a pin 134 extending between a pair of spaced plates 136 and 138 fixed to and extending outwardly from the sides of the support 124. A coil spring 140 acts between the latch 126 and a portion 142 of a member 144 interposed between the plates 136 and 138 and urges the latch clockwise, as viewed in FIG. 6, about the pin 134 and against a rear portion 146 of the member 144. The latch 126 is movable between a vertical, inoperative position shown in FIG. 4, and a horizontal, operative or locking position shown in FIGS. 6, 7 and 8, by means of a rod or handle 148 pivotally mounted on the underside of the block 132 and extending upwardly through an opening formed in the cover plate 56. The handle is retained in either position by a pipe section 150 having an outer diameter larger than the width of the center portion of the opening. In the operative or locking position, the latch 126 is operative to engage and retain a projection 152 welded to the side of the clevis 80 on the rearward end of the link 74 when the wheel 36 is pivoted to its transport position. As shown in FIG. 6, the projection 152 and the link 74 are held against the member 90 on the second link 76, and the latter is held against the rear surface of the member 144 on the latch mechanism. When the furrow wheel support structure is locked in its transport position, movement of both links 74 and 76 is prevented by the latch mechanism 118, and thus both the lateral position and the lead angle of the furrow wheel 36 are fixed. The fore-and-aft position of the latch 126, and thus the transport position of the wheel 36, may be adjusted, as previously mentioned, by means of the bolt 122.

During normal operation of the tiller, the handle 148 is in its right-hand position as shown in FIGS. 4 and 5, the latch 126 thus being in its vertical, inoperative position, and the wheel 36 is free to swing from its normal operating position to its left turn position and to thereafter return to its operating position as a left turn is negotiated by the implement. When it is desired to convert the implement for endwise transport, it is necessary to move the handle 148 to its left-hand position, then turn the tiller to the left, causing the wheel 36 to swing around to its transport position. When the wheel assumes the latter position, the latch 126 will automatically engage the projection 152 on the link 74 and lock the wheel in place. The wheel is released from its transport position by returning the handle 148 to its right-hand position.

We claim:

1. In a disc tiller or the like having a frame, a plurality of ground-working tools supported on the frame, wheel means for supporting the frame relative to the ground and including a furrow wheel adapted to ride in a furrow formed by the ground-working tools, control structure mounting the furrow wheel on the frame comprising:
   a. first, rearwardly extending arm means pivotally mounted at its forward end on the frame;
   b. second arm means pivotally mounted medially on the rearward end of the first arm means, the furrow wheel being rotatably mounted on one end of the second arm means;
   c. pivot structure means on the frame;
   d. first link means slidably received in said pivot structure means and pivotally connected to said first arm means;
   e. second link means slidably received in said pivot structure means and pivotally connected to the end of the second arm means opposite the end thereof mounting the furrow wheel;
   f. stop means on said first and second link means acting against said pivot means to define the normal operating position of said furrow wheel; and,
   g. spring means biasing said stop means on said first and second link means toward said pivot structure, said spring means permitting said stop means on said first and second link means to move away from said pivot means, and thereby permitting said furrow wheel to swing away from its normal operating position, in response to an abnormal side load on said wheel.

2. The invention defined in claim 1, wherein the stop means on one of said link means is engageable with said pivot structure means, and wherein the stop means on the other of said link means is engageable with the stop means on said one link means, and wherein said spring means acts between the frame and said other link means to bias the stop means on said other link means against the stop means on said one link means and, in turn, to bias the stop means on said one link means against said pivot structure means.

3. The invention defined in claim 1 wherein the stop means on said first and second link means is adjustable.

4. The invention defined in claim 1 wherein said pivot structure means comprises trunnion means.

5. The invention defined in claim 1 wherein said second link means comprises a first member slidably received in said pivot structure means, and a second member linking said first member with said second arm means; and further including means maintaining said first link means and said first member of said second link means in fixed angular relationship.

6. The invention defined in claim 5 wherein said first link means is slidably received within the first member of said second link means.

7. The invention defined in claim 1 wherein one of said link means is slidably received within the other of said link means.

8. The invention defined in claim 7 wherein the stop means on said other link means is engageable with said pivot structure means, and wherein the stop means on said one link means is engageable with said stop means on said other link means, and wherein said spring means acts between the frame and said one link means to bias the stop means on said one link means against the stop means on said other link means and, in turn, to bias the stop means on said other link means against said pivot means.

9. The invention defined in claim 1 including means mounted on the frame for selectively locking said first and second link means relative to the frame, and thereby locking said furrow wheel in its transport position.

10. In a disc tiller or the like having a frame, a plurality of ground-working tools supported on the frame, wheel means for supporting the frame relative to the ground and including a furrow wheel adapted to ride in a furrow formed by the ground-working tools, control structure mounting the furrow wheel on the frame comprising:
   a. first, rearwardly extending arm means pivotally mounted at its forward end on the frame;
   b. second arm means pivotally mounted medially on the rearward end of the first arm means, the furrow wheel being rotatably mounted on one end of the second arm means;
   c. stop means mounted on the frame;
   d. stop means connected to said first and second arm means and acting against said stop means on said frame to define the normal operating position of said wheel;
   e. spring means biasing the stop means on one of said arms against the stop means on the other of said arms and, in turn biasing the stop means on said other arm against the stop means on the frame, said spring means permitting said stop means on said arms to move away from the stop means on said frame, and thereby permitting said furrow wheel to swing away from its normal operating position, in response to an abnormal side load on said wheel.

11. In a disc tiller or the like having a frame, a plurality of ground-working tools supported on the frame, wheel means for supporting the frame relative to the ground and including a furrow wheel adapted to ride in a furrow formed by the ground-working tools, control structure mounting the furrow wheel on the frame comprising:
   a. first, rearwardly extending arm means pivotally mounted at its forward end on the frame;
   b. second arm means pivotally mounted medially on the rearward end of the first arm means, the furrow wheel being rotatably mounted on one end of the second arm means;
   c. stop means mounted on the frame;
   d. stop means connected to said second arm means and engageable with said stop means on said frame to define the angle of said furrow wheel for normal operating purposes;
   e. stop means connected to said first arm and engageable with said stop means on said second arm to define the lateral position of said wheel for normal operating purposes;
   f. spring means biasing said stop means on said first arm against said stop means on said second arm and, in turn biasing said stop means on said second arm against said stop means on said frame, said spring means permitting said stop means on said first and second arm means to move away from said stop means on said frame, and thereby permitting said furrow wheel to swing away from its normal operating position, in response to an abnormal side load on said wheel.

12. In a disc tiller or the like having a frame, a plurality of ground-working tools supported on the frame, wheel means for supporting the frame relative to the ground and including a furrow wheel adapted to ride in a furrow formed by the ground-working tools, control structure mounting the furrow wheel on the frame comprising:
 a. a vertical pivot on the frame;
 b. a first arm having a forward end mounted on the pivot and extending rearwardly therefrom;
 c. a wheel vertically pivoted on the arm;
 d. a second arm connected to and for pivoting the wheel;
 e. a stop on the frame;
 f. fore-and-aft extending first and second links connected to the respective first and second arms and interconnected to one another for fore-and-aft relative movement, said links being supported on the frame adjacent to and engageable with said stop for limiting rearward movement thereof;
 g. stop means on the second link for limiting rearward movement of the first link relative to the second link; and
 h. means on the frame biasing the first link rearwardly against the stop means on the second link and biasing the first and second links against the stop on the frame.

13. In a disc tiller or the like having a frame, a plurality of ground-working tools supported on the frame, and wheel means for supporting the frame relative to the ground and including a furrow wheel adapted to ride in a furrow formed by the ground-working tools, control structure mounting the furrow wheel on the frame comprising:
 a. first, fore-and-aft extending arm means pivotally mounted at its forward end on the frame;
 b. second arm means pivotally mounted medially on the rearward end of the first arm means, the furrow wheel being rotatably mounted on one end of the second arm means;
 c. pivot structure means on the frame;
 d. first link means received in said pivot structure means for fore-and-aft sliding movement and pivotally connected at its rearward end to said first arm means;
 e. second link means interconnecting the other end of said second arm means with said frame;
 f. stop means on the forward end of said first link means engageable with said pivot means to define the normal operating position of said furrow wheel; and,
 g. means normally urging said stop means rearwardly against said pivot means, though permitting said stop means to move forwardly out of engagement with said pivot means in response to turning movement of the disc tiller from its normal operating position, to thereby permit the wheel to swing away from its normal operating position to its turning position as the disc tiller is turned from its normal operating position.

14. The invention defined in claim 13 wherein said stop means on said first link means is adjustable to permit adjustment of the normal operating position of said furrow wheel.

15. The invention defined in claim 14 wherein said stop means comprises a member threadably received on said first link means.

16. The invention defined in claim 13 wherein said second link means is adjustable in length to permit adjustment of the normal operating position of said furrow wheel.

* * * * *